Oct. 23, 1934.   H. A. BERLINER   1,977,616
AIRPLANE CONSTRUCTION
Filed Dec. 30, 1929   6 Sheets-Sheet 2
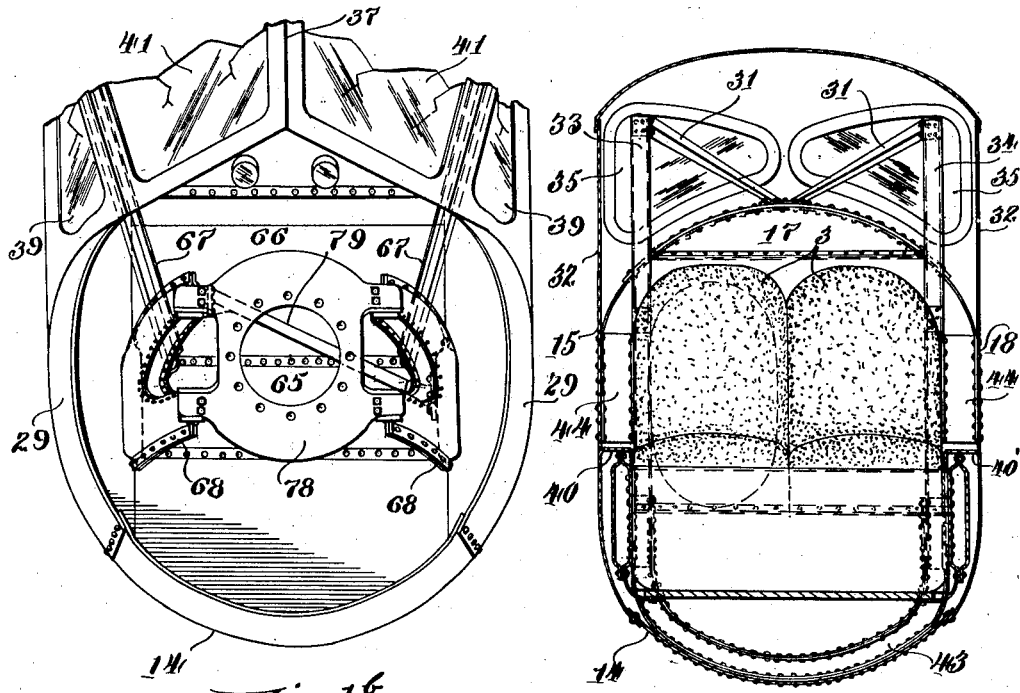
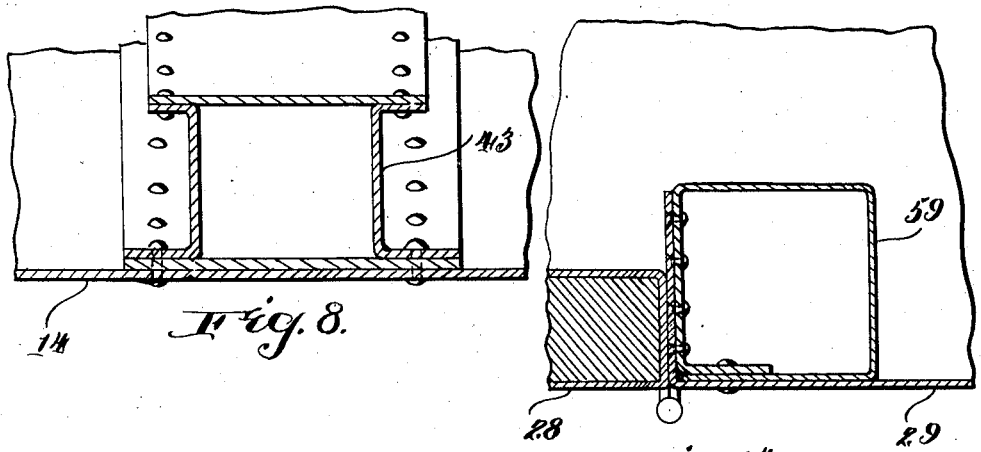

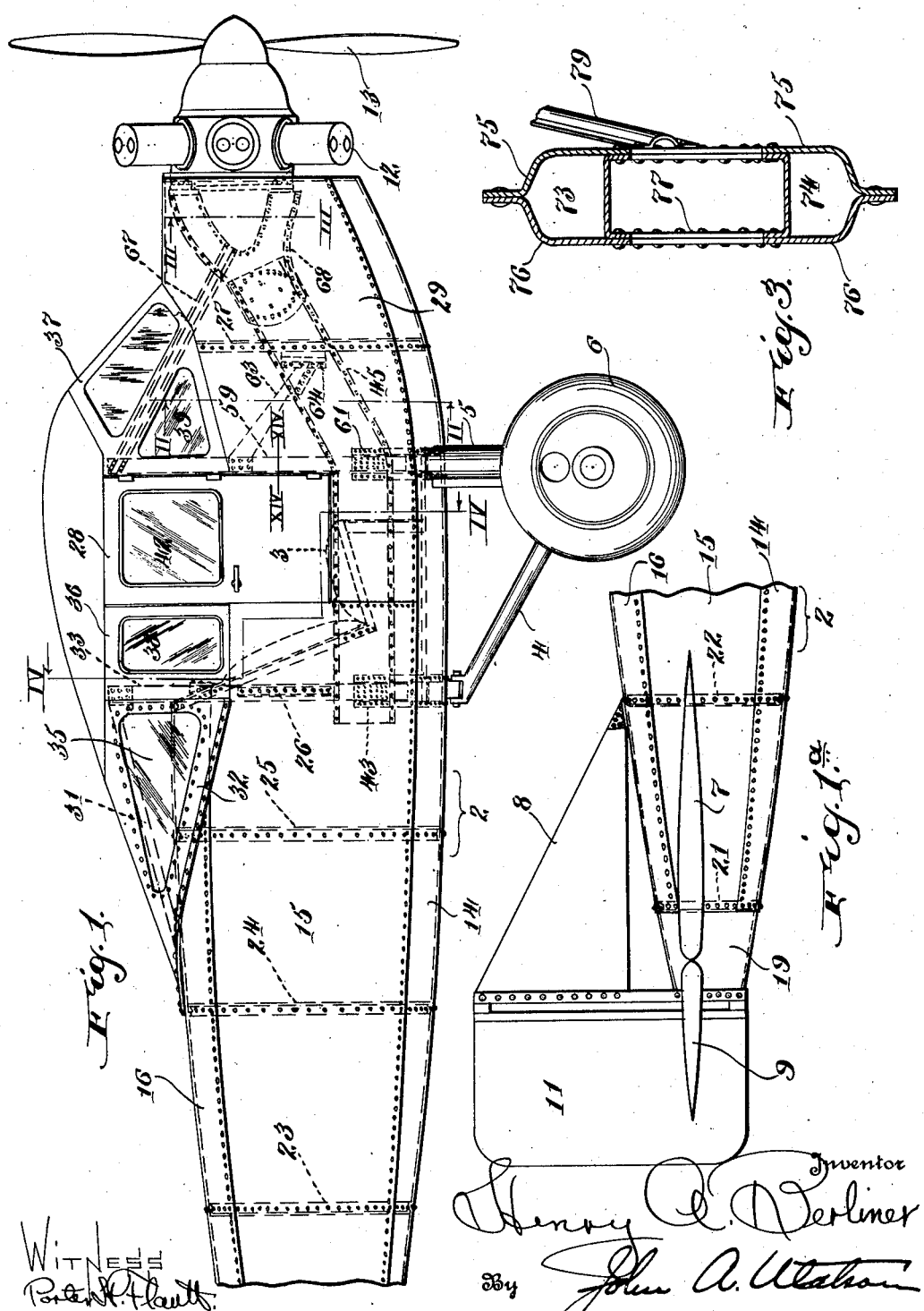

Oct. 23, 1934.   H. A. BERLINER   1,977,616
AIRPLANE CONSTRUCTION
Filed Dec. 30, 1929   6 Sheets-Sheet 3
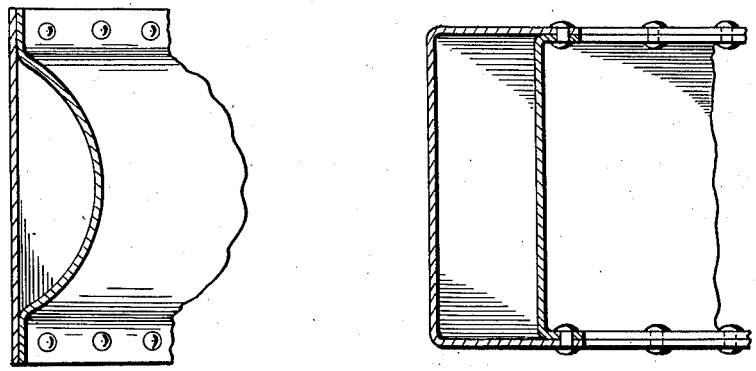
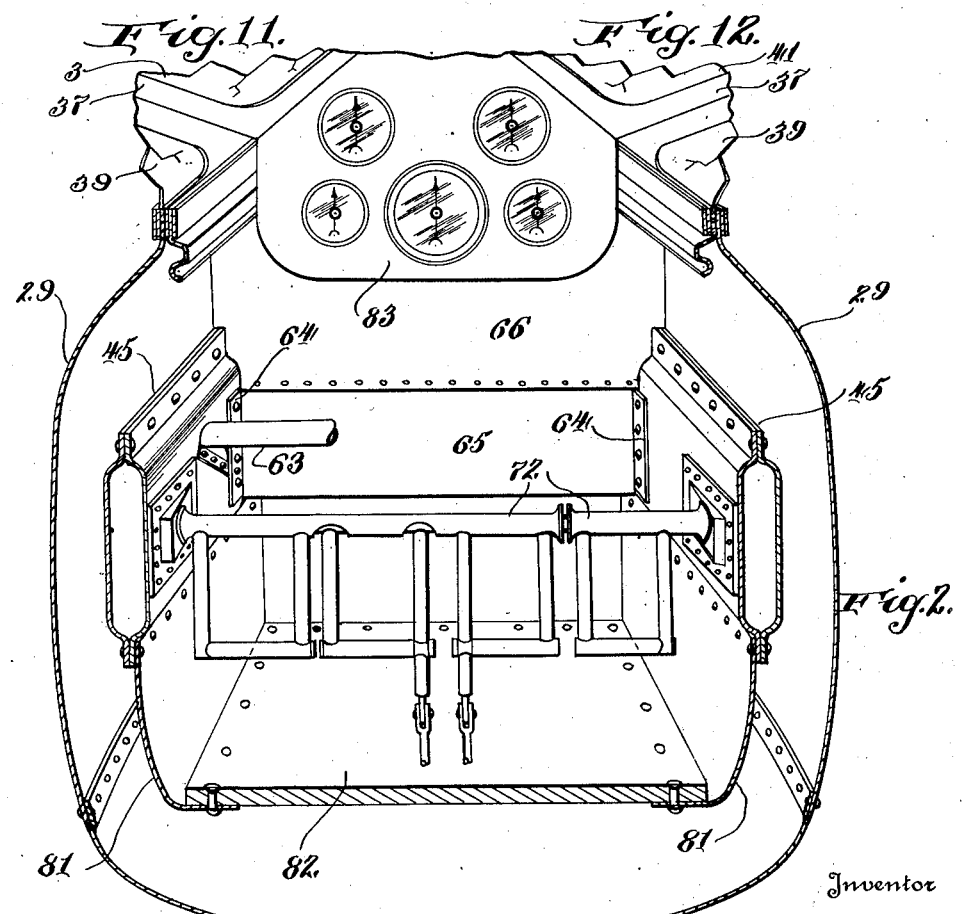

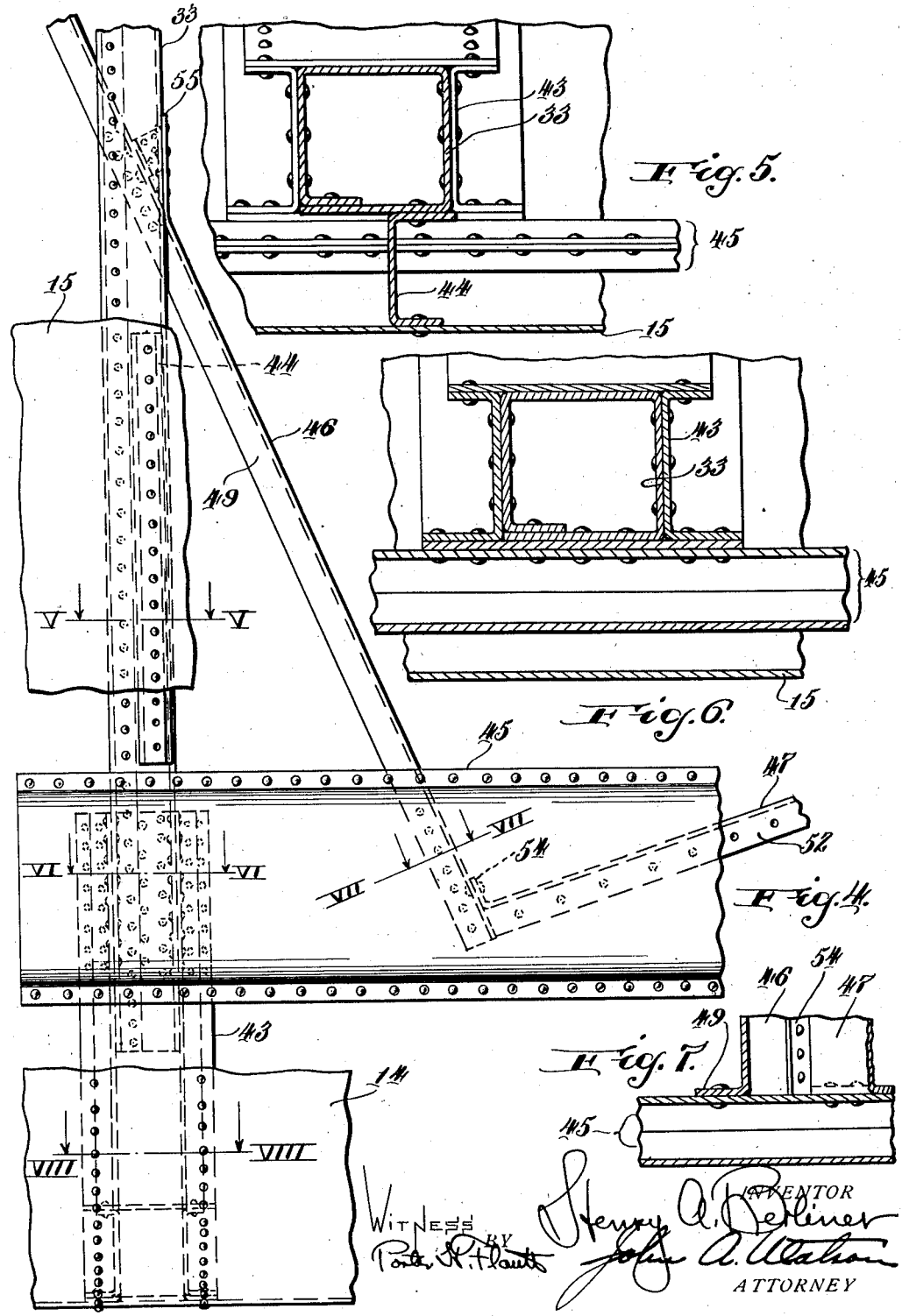

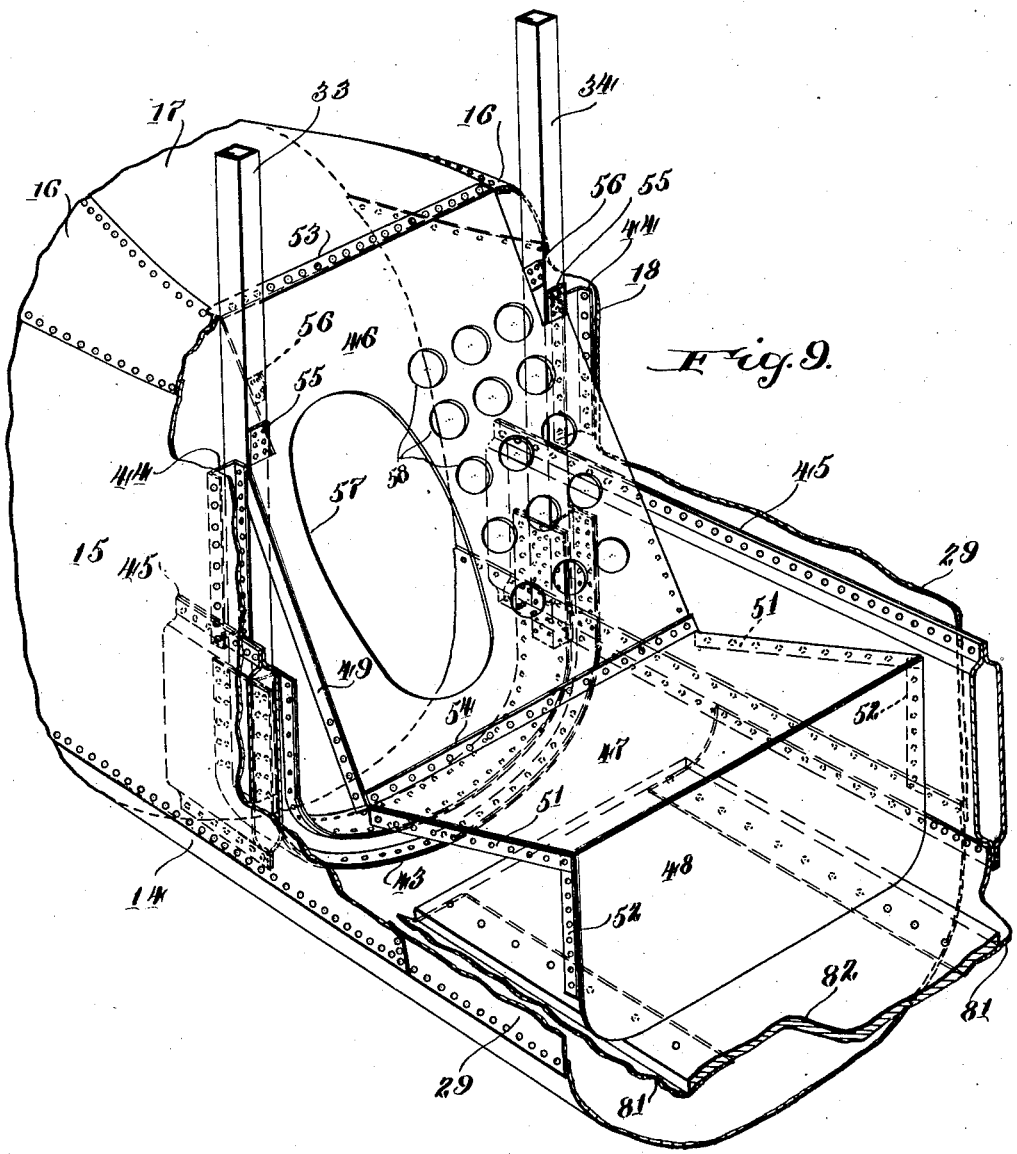

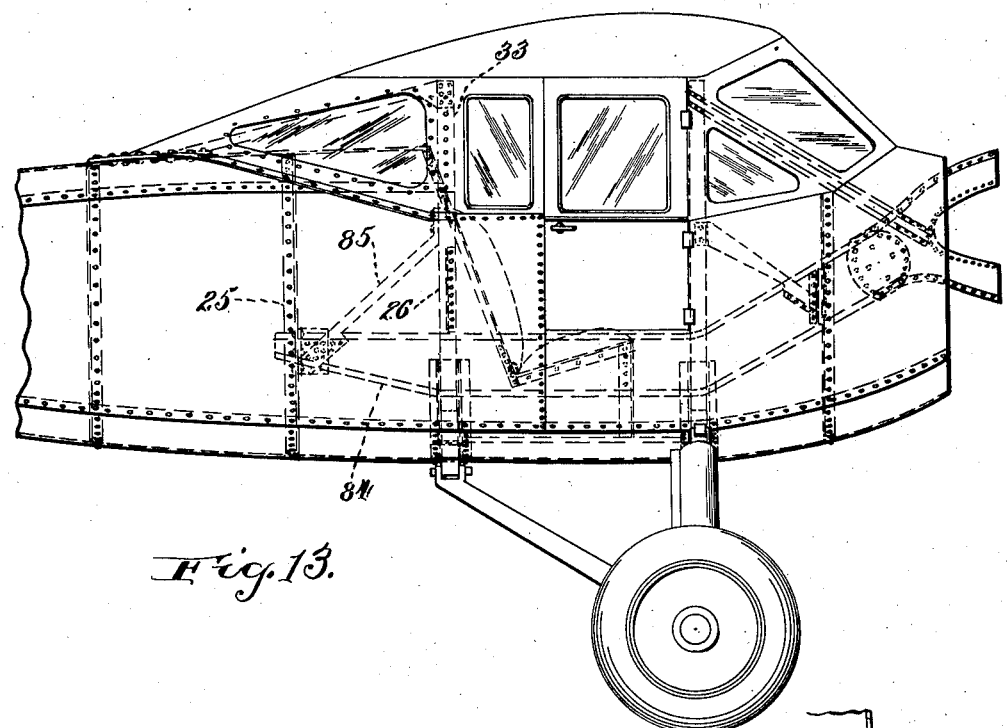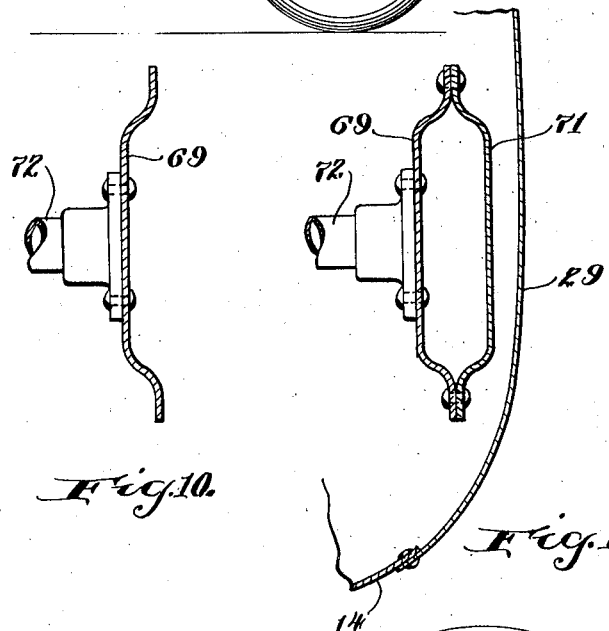

Patented Oct. 23, 1934

1,977,616

UNITED STATES PATENT OFFICE 1,977,616

AIRPLANE CONSTRUCTION

Henry A. Berliner, Washington, D. C., assignor to Berliner-Joyce Aircraft Corporation, Dundalk, Md., a corporation of Maryland Application December 30, 1929, Serial No. 417,268

9 Claims. (Cl. 244—30)

This invention pertains to airplane construction and relates more particularly to a strengthening and supporting structure which, while primarily useful in connection with airplanes having a monocoque type of fuselage, is also desirable and very useful in other types of airplane and in lighter-than-air craft construction as well. For the purpose of simplifying illustration and description, the invention will be disclosed in connection with and in a form found particularly desirable for a monoplane having a monocoque fuselage.

Maximum strength per unit of weight and aerodynamical efficiency for aircraft bodies including fuselages, nacelles, etc., dictate, among other factors, "stream lines" and a continuous or unbroken shell and external surface. If the necessary strength for a "stream-lined" fuselage or the like could be obtained through the manufacture of the fuselage from a single piece of light material and without internal bracing, ribbing, etc., the ideal would be closely approached. However, constructional and other difficulties and economical and other desiderata limit approach to this ideal.

There have been notable attempts to provide a satisfactory and safely strong monocoque type of fuselage or the like. Among the numerous attempts there are included those using veneer strips or sheets of material preformed by wrapping about a core or with dies, or using several metal sheets each appropriately formed into curvilinear shape and of substantially elliptical or circular cross section, the ellipses or circles defining the cross-sectional area, decreasing in size fore and aft of a transverse plane at or near that section of the fuselage constituting the wing section or portion thereof. When individual sheets or plate sections, as they may be variously termed, are used they are ordinarily connected up to one another in telescoping or abutting relation and secured in position and to one another as by riveting to appropriately curved internal longitudinal ribs or stiffeners or to longérons or to both ribs or stiffeners and longérons. It has been proposed to omit both ribs and longérons from this type of construction, but because of the loads which must be carried, as for instance the engine, landing gear, personnel, etc., and the various stresses which must be taken care of, this has not been found possible from a practical and safe standpoint. Reasons of economy and weight have also entered the problem.

I have found that if the fuselage, nacelle or other body of the aircraft be constructed after the teaching of the disclosure herein, that a very practical and safe monocoque type of body may be constructed using sheet material without longitudinal or similar ribs or stiffeners, thereby insuring lightness although maintaining the necessary strength. Of course, if it be desired, longitudinal or similar ribs or stiffeners or longérons may be utilized. Therefore one of the primary objects of the invention is to provide a monocoque fuselage, a nacelle or the like which may be made from a few sheets of suitable material preferably metal, desirably shaped and secured together along seams in overlapping or abutting relation or otherwise to maintain an unbroken or substantially unbroken "stream line" surface, without the necessity of using internal or external longitudinal ribs, braces, stiffeners, and the like, and yet giving a high factor of safety.

Another object is to provide a structural arrangement for aircraft bodies such as fuselages, nacelles, and the like whereby that portion aft of a transverse plane at or near the section of the body constituting the wing or cockpit or corresponding section, may be of monocoque construction and anchored to one or more transverse bulkheads to which one or more hollow, closed section or box beams are in turn secured and carried forward for fastening and supporting some or all of such members as for example an engine, the wings, landing gear and so forth, the whole furnishing a strong, rigid and safe structure.

The design of cabins for cabin planes, particularly for small planes of the character disclosed herein, also offers many difficulties. Perhaps none of these is greater than that of obtaining a maximum height and width of uninterrupted passage into and from the cabin without sacrificing strength or visibility or both, while maintaining a high aerodynamic efficiency including minimum overall dimensions for the fuselage or aircraft body, particularly through and about the cabin or cock-pit section. Many cabin planes are so constructed and their cabins or engine, landing gear, and the like so located, that their longitudinal, lateral, vertical and other compression and tension members either seriously interfere with ingress to and egress from the cabin or cock-pit or they interfere with proper and desirable visibility or with the aerodynamic efficiency of the ship, or they are open to two or all of these objections.

The invention herein disclosed avoids or overcomes all of the aforesaid difficulties and accordingly it becomes a very important object to provide a structural arrangement for airplane construction whereby should the plane be provided with a cabin, there will be no structural element to interfere to any material extent with convenient entrance and exit to and from the cabin and there will be maximum visibility without diminution of the proper safety factor.

Still another object is to provide a peculiar structural arrangement for supporting and securing the engine or power plant, the wings, under carriage, etc., rigidly with respect to the aircraft body, in a simple, effective and economical manner. In this connection certain of the structural elements serve as well to absorb the torque and thrust loads from the engine and propeller as to absorb and distribute the various other loads which may be placed upon them.

A further object is to provide a light and hollow metal beam for aircraft, the beam being so constructed that it is particularly strong for its weight and capable of being attached and secured to other members and elements and assembled in a simple, quick and efficient manner. The ease with which the beam, to which reference is made, lends itself to manufacture, connection and assembly, and the method by which the beam parts are formed and fastened together and to other structure, are of great importance as will appear.

Many other objects as well as the advantages, uses and purposes of the invention and its adaptability to various aircraft bodies will be or should become clearly apparent and understood after reading the following description and claims and after viewing the drawings in which:

Fig. 1 is a fragmentary side elevation of an airplane embodying a preferred form of the invention.

Fig. 1a is a fragmentary side elevation of the rear portion of the airplane shown in Fig. 1 and constitutes a continuation thereof.

Fig. 1b is a front elevation of the body of the airplane shown in Fig. 1 with the engine removed.

Fig. 1c is a sectional view taken through the cabin and body just forward of the seats looking rearward.

Fig. 2 is an enlarged fragmentary cross-sectional view taken substantially along the line II—II of Fig. 1 looking forward.

Fig. 3 is a section of one of the main supporting beams taken substantially along the line III—III of Fig. 1.

Fig. 4 is an enlarged detailed view in side elevation of a portion of the framing about the cabin.

Figs. 5, 6, 7 and 8 are detail sections taken respectively along the lines V—V, VI—VI, VII—VII, and VIII—VIII of Fig. 4.

Fig. 9 is a perspective view of a portion of the fuselage body at and immediately aft of the cabin.

Figs. 10 and 10a are views illustrating a method of attachment of a member to the longitudinal beams and the assembly of the beam.

Figs. 11 and 12 illustrate in isometric modified forms of closed section beams.

Fig. 13 is a fragmentary side elevational view of an airplane embodying a modified form of the invention, and Fig. 14 is a section taken substantially along the line XIV—XIV of Fig. 1.

The cabin airplane, chosen for illustration of a preferred embodiment of the invention, is of what may be termed all-metal construction. Referring to Figs. 1 and 1a for the present, it will be observed that the airplane, the wings have been removed, has a fuselage or body generally designated 2, an enclosed cabin in which a seat or seats 3 is or are disposed, a landing gear including struts 4 and 5 and wheels 6 (one only shown), horizontal and vertical stabilizers 7 and 8 respectively, elevators 9 and rudder 11, and a power plant including an engine 12 and a propeller 13, both diagrammatically illustrated. The fuselage is composed of a few sheet metal strips or plates 14, 15, 16, 17 and 18 all of which, with the exception of the plate or sheet 17, extend from a section 19 at the tail forwardly at least to the cabin and are appropriately formed and riveted together to provide a monocoque shell. In larger planes, economical or other reasons may dictate the use of two or more plates joined together and extending longitudinally instead of one plate as shown; but, ordinarily, the fewer the plates the less the chances of structural weaknesses or defects. The plate 16 is divided from a place a short distance to the rear of the cabin for insertion of the plate 17 which is riveted or otherwise suitably secured in the position illustrated. The plate 14 is extended forwardly to the nose of the plane body, that is, to the engine mounting. The wings, the positions for which have been indicated at 10, over the cabin, may, of course, be located intermediate the top and bottom of the fuselage or at or below the bottom of the cabin or the plane may be a bi-plane or other type since the invention is applicable to all of them.

Preferably, the fuselage is divided into sections by bulkheads designated 21, 22, 23, 24, 25, 26 and 27, the bulkheads being formed by metal angles appropriately shaped and located internally of the shell to which they are riveted or welded or otherwise appropriately secured. These bulkheads may, if desired, be solid, that is, continuous transverse sheets or plates but as this is generally unnecessary bulk and weight for the strength required, I prefer metal angles. The sheets or plates 15 and 18 are preferably carried forward to the line of the door 28 of the cabin and from thence forward any suitable cowling structure 29 together with the plate 14 covers the framing and encloses the forward part of the body or fuselage.

Suitable sheet metal or other brace members 31 are secured to and extend upward, outward and forward from the top of the shell at or adjacent the bulkhead 24 to the top ends of upright posts 33 and 34 to which they are secured. The posts 33 and 34 form part of the bulkhead 26. Cowling 32 is used to stream line and enclose this portion of the fuselage from the posts 33 and 34 rearwardly and from the shell upwardly to the top of the body while windows 35 in the cowling provide lateral and rearward vision. Cowling members 36 and 37, secured in place in any suitable manner, have windows 38, 39, and 41 providing forward, lateral and upward visibility. The door 28, which is hinged at its forward edge, is provided with a window 42, and a similar window may be provided in a similar door on the opposite side of the cabin or in the cabin cowling if no door is provided. All of the aforesaid parts are so arranged and constructed as to provide a good stream lined fuselage including a cabin as will be understood.

Referring now more particularly to Figs. 1c, 4, 5, 6, 7, 8 and 9, which show in some detail the parts at and about the bulkhead 26 and the seat or seats 3. A U-shaped box beam 43 appropriately curved to the internal shape of the fuselage and fitting the bottom plate 14, is riveted to the bottom plate or sheet 14 and forms a bottom portion of this bulkhead. This beam is formed of light sheet metal and is hollow for lightness and reception of the bottom ends of the sheet metal posts 33 and 34 which are riveted or otherwise secured thereto and likewise secured to channel members 44 which are in turn riveted or otherwise secured to the plates 15 and 18 of the monocoque shell. The transverse beam 43 is also riveted or otherwise secured to the inner sides of hollow closed-section or box beams generally designated 45 which extend longitudinally of the fuselage from this point forward.

The frame for the seat or seats 3 is preferably constructed of metal sheets 46, 47, and 48 appropriately flanged as shown at 49, 51, 52, 53, and 54 to give greater rigidity and for securing to adjacent structure. The flanges 49, 51 and 52 are preferably riveted at indicated portions to the interior side of the beam 45, the flange 53 to the plate or sheet 17, and the flange 54 on the sheet 47 to the sheet 46 forming the frame for the back of the seats. The sheet 46 is also provided with struck-up flanges or tabs 55 and 56 which are riveted to the posts 33 and 34 while this plate may have portions cut away leaving openings, 57 and 58, for the purposes of lightening the structure. The bulkhead 26 may thus be said to be composed of the beam 43, the channel members 44 and the posts 33 and 34, while the seat framing provides additional strength and though the whole is relatively light it is rigid and very strong and more than well adapted to carry the load of the entire body or fuselage rearward thereof.

The sheet 14 is riveted or otherwise rigidly secured to the box beam 43, and the sheets 15 and 18 to the channel members 44 but along the bottom of the door 28, the sheet 15, and for a corresponding distance along the opposite side of the body, the sheet 18, is turned inward and downward as shown at 40, 40', respectively, to provide a sill. At a forward portion of the cabin arise posts 59 which are disposed within and secured to the ends of a hollow box beam 61, which is similar to the box beam 43 and which is similarly secured to the sheet 14. The skin or cowling 29 is suitably secured to the posts 59 as best illustrated in Fig. 14, and, extending forwardly and diagonally downwardly from a place intermediate the length of one of the posts 59, may be a brace member 63 which is connected to the inner side of the opposite beam 45 by a gusset plate or the like and to a flange 64 formed on a transverse sheet 65 which traverses the fuselage at the forward end of the cockpit or cabin section at the forward bulkhead 27. A sheet 66 closes the forward part of the cockpit. The upper ends of the posts 59 may also be braced by suitable forwardly and downwardly directed braces 67 which at their forward ends may be secured to sheet metal yoke members 68 which are secured to and form continuations of the beams 45. The primary function of the braces 67 is to assist in supporting the upper portions of the cabin or the superstructure and so forth of the plane and to assist in transmitting such loads to the beam or beams 45, that is, to act as compression and torsion members, although these braces by reason of their positions and connections may play an incidental part in strengthening the beams 45. The landing gear, including the struts 4 and 5, is preferably secured to the transverse box beams 43 and 61, but as the arrangement and construction of the landing gear and its method of connection, per se, forms no part of the invention and may be designed in any well-known manner, apparent to those skilled in the art, it will not be further described herein.

The closed section or box beams 45 are substantially identical in construction and arrangement and a description of one should suffice for both. Referring for the moment to Figs. 10 and 10a, it will be seen that the beam consists of two plates 69 and 71 each so shaped or flanged that when the plates or halves of the beam are put together they form a hollow box beam or hollow beam of closed-section type. The parts 69 and 71 may be sheet metal stampings or they may be formed in any appropriate manner but as they have the well-known characteristics, when put together, of strength and lightness, they are admirably adapted for the purposes of this invention. The formation of the beam in this manner also greatly facilitates fabrication of the fuselage because the parts to be secured to the beam need only be secured to one side thereof and, consequently, such parts may be secured before the parts of the beam are assembled together. This is very clearly illustrated in Figs. 10 and 10a wherein a pivot rod 72, for the controls, is shown connected to the beam before and after the parts of the beam have been combined by riveting.

Each beam 45 is of cantilever type and from its point of anchorage to the bulkhead 26 including the transverse beam 43, extends forward horizontally to its anchorage to the beam 61 and thence upward and forward past its anchorage to the bulkhead 27, where it is rigidly secured to its yoke member 68. Each yoke member (see Fig. 3) is substantially of box type even throughout its arms generally designated 73 and 74 and consists of suitably formed sheet metal plates 75 and 76 which are joined together at their open side by an appropriately formed plate 77. The yoke ends 68 of the beams 45 may be suitably joined together by an engine bed plate member 78 to which the engine 12 is secured and from which it is immediately supported. One or more interbracing members 79 may be employed if desired.

The beams 45, therefore, not only provide a strong and rigid support for the engine and its associated parts, taking up the torque and thrust loads from the engine and propeller and absorbing and distributing them, but also provide a structural connection of great strength between the monocoque fuselage or shell, that is the portion to the rear of the transverse plane at or near the section of the body constituting the wing or cockpit or cabin section, and the power plant and other forward portions of the body. These beams also serve not only relatively to support the fore and rear portions of the body or fuselage of the airplane and the power plant but render unnecessary other longitudinal structural elements which have heretofore been required. Furthermore, since these beams may be disposed at a low position in the fuselage, there is little, if any interference with ingress into or egress from the cabin and as a consequence, a cabin airplane, such as the type illustrated, may have a higher door and greater visibility. It will be appreciated, of course, that these cantilever beams could be disposed at higher positions in the body if desirable and could even be disposed over and across the top of the cabin and downwardly to the power plant instead of as illustrated. In some instances a single beam 45, centrally disposed, may be used instead of two as illustrated, as will be appreciated.

In order to strengthen the bottom of the cabin section but primarily to provide a suitable flooring therein, sheet metal strips 81 riveted or otherwise secured along one longitudinal edge of each to the bottom flanges of the beams 45 are secured to and beneath a board 48 which extends beneath the plate 82 of the seat frame to the rear and beneath and beyond the control mechanism including the pivot bar 72 forward. The frame of the seats is suitably upholstered for use by a pilot and passenger and an instrument board 83 may be suitably mounted in any convenient manner in the forward part of the cabin.

Figs. 11 and 12 illustrate modified types of box or closed section beams which may be substituted for the beams 45 if desired. Other forms will be apparent to those skilled in the art. Fig. 13 illustrates a construction of airplane utilizing slightly modified cantilever beams. These beams (one shown), generally designated 84, may be of a construction similar to the beams 45 but are carried back beyond the bulkhead 26 and tapered down in height therefrom to the bulkhead 25 to which they are also anchored as by riveting or otherwise. If desired, a brace member 85 may be connected at one end with each beam 84 at its rear end and with the bulkhead 25 and to a rearward face of an upper portion of each of the uprights 33 and 34. Of course, in this case also, a single central cantilever beam may be used if desired instead of two. The construction of the airplane illustrated in Fig. 13 may be otherwise similar to the construction of the embodiment previously described.

While the invention has been illustrated and described in a preferred form and while several modified details have been disclosed, it will be appreciated that the invention is of broader application and is susceptible of many variations and embodiments and in many forms and relationships which might bear little, if any, physical resemblance to what has been illustrated and described. Therefore, I do not wish to be limited only to what I have illustrated and described but only by the spirit of the invention and the scope of the appended claims.

I claim:

1. In aircraft body construction in combination, a monocoque shell extending rearward to the end of the body from a predetermined plane transverse the body, a bulkhead comprising a structural member abutting the interior surface of said shell along a line corresponding to the line of intersection of a transverse plane perpendicular to the axis of the body, means rigidly securing said bulkhead and shell together, and a substantially cantilever type beam rigidly secured, substantially at one end, to said bulkhead and extending forwardly therefrom, said beam extending substantially parallel to the longitudinal axis of the body for a substantial distance from said bulkhead and thence extending diagonally upward and forward.

2. A construction as defined in claim 1 in which said beam is composed of a pair of sheet metal channels, the free longitudinal edge portions of each channel being flanged and the flanges respectively secured to the corresponding flanges of the opposite channel, the channels opposing one another at their open sides.

3. In aircraft in combination, a shell of monocoque formation extending in one direction from a plane transverse thereof, a hollow metal beam of substantially cantilever type extending in the opposite direction from said plane, the outer end of the beam extending at an angle to the longitudinal axis of the body, and a prime mover cantilevered on the outer end of said beam.

4. In aircraft construction in combination, a monocoque shell extending rearward toward the empennage end of the craft from a given transverse plane, a transverse structural member anchored to said shell adjacent said plane, a substantially cantilever type load carrying member anchored at one end to and extending forwardly from said transverse structural member, said load carrying member terminating substantially at said transverse structural member, the forward end of said load carrying member being forked, and a prime mover secured to said forked end of said load carrying member.

5. In aircraft construction in combination, a monocoque shell extending rearward toward the empennage end of the craft from a given transverse plane, a transverse structural member anchored to said shell adjacent said plane, and a cantilever type load carrying member anchored at one end to and extending forwardly from said transverse structural member, a portion of said cantilever member extending forwardly for a predetermined distance in substantially parallel relation to the longitudinal axis of the body and thence at an angle less than a straight angle to itself for a predetermined further distance, said cantilever member being adapted to support a load at its forward end portion.

6. In an aircraft body having a cockpit, a monocoque fuselage shell extending rearwardly of the cockpit, a transverse member at the forward part of said shell to the rear of said cockpit, a substantially cantilever type supporting beam of closed section extending forwardly from said transverse member for carrying a load placed forwardly of said cockpit, and means rigidly connecting the beam, shell and transverse member.

7. In aircraft body construction about the cockpit thereof, a fuselage shell of monocoque formation extending rearwardly from a predetermined transverse plane, a transverse bulkhead disposed immediately to the rear of said cockpit, the said bulkhead and shell being secured together, and a box section supporting beam secured to said bulkhead and extending forwardly past said cockpit adjacent and substantially parallel to a substantially horizontal enclosing wall thereof and thence angularly toward the opposite wall of the fuselage.

8. In aircraft body construction about the cockpit thereof, a fuselage shell of monocoque formation extending rearwardly from a predetermined transverse plane, a transverse structural member disposed immediately to the rear of the cockpit and secured to said shell, and a hollow metal beam of substantially cantilever type secured to said transverse member and extending forwardly therefrom in close proximity to a substantially horizontal wall of the fuselage continued from said shell to a place forwardly of the cockpit and thence at an oblique angle toward the opposite wall.

9. In an aircraft body having a cockpit, a monocoque shell extending rearwardly toward the empennage end of the craft from a given transverse plane abaft the cockpit, a transverse structural member anchored to said shell adjacent said plane at the back of the cockpit, and a pair of spaced, inherently rigid and substantially cantilever-type beams of closed section anchored at corresponding ends to and extending forwardly from said transverse structural member for carrying a load placed forwardly of the cockpit.

HENRY A. BERLINER.